United States Patent

[11] 3,609,449

| [72] | Inventor | Joseph F. Vercellotti |
| | | Novelty, Ohio |
| [21] | Appl. No. | 797,047 |
| [22] | Filed | Feb. 6, 1969 |
| [45] | Patented | Sept. 28, 1971 |
| [73] | Assignee | General Electric Company |

[54] VEHICLE HEADLIGHTING AND STANDBY PARKING LIGHT SYSTEM
5 Claims, 1 Drawing Fig.

[52] U.S. Cl. .................................................. 315/82
[51] Int. Cl. ................................................... B60g 1/04
[50] Field of Search ................................. 315/77, 82, 83

[56] References Cited
UNITED STATES PATENTS
3,040,207  6/1962  Grontkowski ............... 315/77
3,479,557  11/1969  Schultz ......................... 315/83

OTHER REFERENCES
"Diode Circuit Handbook" R. P. Turner March 1963, Cover Pages (2), Preface and pages 85 and 86.

*Primary Examiner*—Roy Lake
*Assistant Examiner*—V. Lafranchi
*Attorneys*—James J. Lazna, Henry P. Truesdell, Frank L. Neuhauser, Oscar B. Waddell and Melvin M. Goldenberg ABSTRACT: In a vehicle headlighting system including a head lamp and a parking lamp each containing a filament, along with a conventional two-position main switch for selectively operating either the parking lamp or the head lamp, a junction diode is connected across the hot sides of the filaments in the respective lamps so as to block current passage through the head lamp filament but permit current passage through the parking lamp when the main switch is in the first one of its two operating positions, and permit current passage through both the head lamp and the parking lamp when the main switch is in the second one of its two operating positions, thereby assuring continued operation of the parking lamp in the event the head lamp filament should become ruptured and the head lamp rendered inoperative.

PATENTED SEP 28 1971
3,609,449
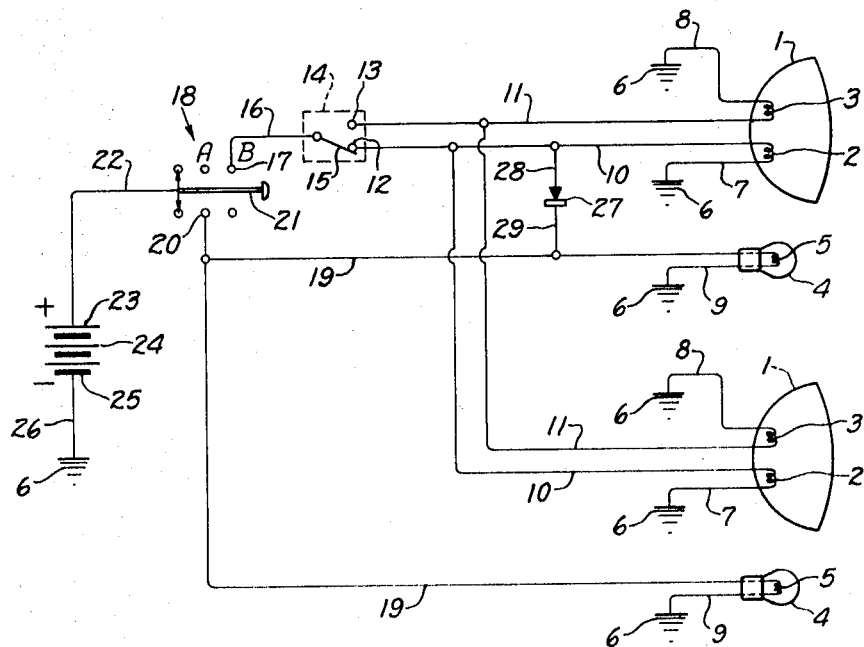
Inventor:
Joseph F. Vercellotti
by *James J. Lagner*
His Attorney though for the reasons discussed above, it will not maintain the parking lamps 4 operative if either or both head lamps 1 should become inoperative due to the failure of the filaments 2 or 3 thereof.

3,609,449

1
VEHICLE HEADLIGHTING AND STANDBY PARKING LIGHT SYSTEM

BACKGROUND OF THE INVENTION

1. Field of the Invention

This invention relates in general to a vehicle headlighting and parking light system, and more particularly to a circuit arrangement therefor which will permit the selective operation of either the parking lamp alone or together with the head lamp in parallel relation thereto.

Vehicle headlighting systems as conventionally constituted heretofore have included a pair of head lamps and a pair of parking lamps which are operated by a two-position main switch mounted on the instrument panel of the vehicle in the driver's compartment and arranged to selectively operate either the parking lamps alone or the head lamps alone. With such systems, however, if one of the head lamps should become inoperative due to the failure of its filament, a dangerous driving condition is thereby created as a result of the confusion which it causes to an oncoming driver as to the actual or true location of the lateral extremities of the vehicle. Recently, however, and primarily in response to government initiated programs aimed at reducing roadway driving hazards, such conventional-type headlighting systems have been modified by changing the construction of the main switch and altering the circuit connections thereto of the head lamp and parking lamp so as to enable the selective operation of either the parking lamps alone, or together with the head lamps. With this modified systems, the parking lamps continue to remain operative even though one or both head lamps should become inoperative by the failure of the filaments thereof. The continued operation of the parking lights then serves to clearly demarcate to an oncoming driver the lateral extremities of the approaching vehicle, thereby eliminating the possibility of any confusion or mistake on his part as to the location of the vehicle extremities.

While such modified-type headlight systems have proven effective to eliminate, or at least greatly minimize, the driving hazard associated with a head lamp failure, this problem nevertheless is still prevalent to a considerable degree at the present time due to the fact that by far the greater proportion of motor vehicles which are being operated on the roadways and highways today are still equipped with the previous conventional-type headlighting systems as described above. Accordingly, in the interest of promoting greater roadway safety, it is highly desirable that some way be devised of altering such previous conventional-type headlighting systems so that they will operate in the same manner as the modified headlighting systems with which motor vehicles are currently being equipped, in order to thereby provide for the continued operation of the parking lamps, when the main switch is in its headlight operating position, despite the failure of the filament in one or both of the head lamps.

SUMMARY OF THE INVENTION

It is an object of the invention, therefore, to provide a vehicle headlighting and parking lamp system which employs the same type main control switch customarily employed heretofore in the previous conventional-type headlighting systems and which is operable to effect the operation of the parking lamps either alone, or together with the head lamps in a manner such as to assure the continued operation of the parking lamps despite the failure of either one or both head lamps.

Another object of the invention is to provide a vehicle headlighting and parking lamp system to which the previous conventional-type headlighting systems can be easily converted in a quick and simple manner and at little expense without any change in the main control switch thereof or its circuit connections, and which is effective to maintain the continued operation of the parking lamps, despite the failure of either one or both of the head lamps, when the main control switch is in its head lamp operating position.

2

Briefly stated, in accordance with one aspect of the invention, a junction diode of appropriate current and voltage rating characteristics is electrically connected across the ends of the parking lamp and head lamp filaments that are connected to the main control switch of the vehicle headlighting and parking lamp systems, the junction diode being connected across the filament ends so as to be forward biased through the head lamp terminal of the control switch, and thus electrically conductive when the head lamp filaments are energized. The junction diode will thus block the flow of current to the head lamp when the main control switch is in its parking lamp operating position but will pass the current to the parking lamp when the main switch is in its head-lamp-operating position. As a result, the parking lamp will continue to operate, when the main control switch is in its head-lamp-operating position, despite the failure of the head lamp filament.

Further objects and advantages of the invention will appear from the following detailed description of a species thereof and from the accompanying drawing.

BRIEF DESCRIPTION OF THE DRAWING

The single FIGURE of the drawing is a schematic circuit diagram of a vehicle headlighting and parking lamp system comprising the invention.

DESCRIPTION OF THE PREFERRED EMBODIMENT

Referring to the drawing, the vehicle headlighting and parking lamp system according to the invention comprises a pair of head lamps 1 which are mounted in conventional manner on the front end of the vehicle adjacent the opposite sides thereof and which are each provided with a low-beam filament light source 2 and preferably, in addition, with a high-beam filament light source 3. A pair of conventional-type parking lamps 4 each provided with a filament light source 5 are also mounted on the front end of the vehicle in associated relation to respective ones of the head lamps 1.

One end of each of the filaments 2, 3 and 5 is electrically connected to a ground 6 by means of respective electrical conductors 7, 8 and 9. The other ends of the two filaments 2 and 3 of each head lamp 1 are electrically connected by means of respective electrical conductors 10 and 11 to the two terminals 12 and 13, respectively, of a conventional-type dimmer or foot switch 14 the movable selector or contactor element 15 of which is electrically connected by means of electrical conductor 16 to the head lamp terminal 17 of a main control or headlight and parking lamp switch 18 which is mounted in the conventional manner within the driver's compartment of the vehicle, such as on the instrument panel. The other ends of the filaments 5 of the two parking lamps 4 are electrically connected by means of respective electrical conductors 19 to the parking lamp terminal 20 of the main control switch 18. The movable contactor element 21 of the control switch 18 is electrically connected, by means of electrical conductor 22, to the positive side 23 of a source of electrical energy or battery 24 the negative side 25 of which is connected, by means of electrical conductor 26, to ground 6.

The main control switch 18, which may be of the conventional push-pull type, has two operating positions as indicated at A and B. In the first position A of the switch 18, the movable contactor element 21 thereof connects the parking lamp terminal 20 of the switch to the battery 24 through the conductor 22, thereby completing an electrical circuit through the filaments 5 of the two parking lamps 4 so as to cause them to become operative. In the second position B of the main switch 18, the movable contactor element 21 thereof connects the head lamp terminal 17 of the switch to the battery 24, through the conductor 22, thereby completing an electrical circuit through either the low-beam filaments 2 or the high beam filaments 3 of the two head lamps 1, depending upon the particular position of the movable contactor 15 of the dimmer or foot switch 14. As will be obvious, the headlighting and parking lamp system as thus far described is identical to the conventional type systems previously in use for many years, al- In accordance with the invention, a junction diode 27 of appropriate current and voltage characteristics is electrically connected, by means of electrical conductors 28 and 29, across the conductors 10 and 19 which respectively connect the head lamp terminal 17 of the main switch 18, through conductor 16 and the switch contactor 15 and terminal 12, to one end of the head lamp filaments 2, and the parking lamp terminal 20 of the main switch 18 to one end of the parking lamp filaments 5, the other ends of the filaments 2 and 5 being connected to ground 6, as shown. The junction diode 27 thus is connected across the respective ends of the filaments 2 and 5 that are connected to the so-called "hot" side of the line when the two switches 14 and 18 are in their operative positions.

For the purposes of the invention, the junction diode 27 is connected or poled across the conductors 10 and 19 so as to be forward biased through the head lamp terminal 17, and thus electrically conductive when the head lamp filaments 2 are energized. The junction diode 27 thus will operate to conduct the current from the battery 24 to the parking lamp filaments 5 when the main switch 18 is moved to its second operating position B to connect the head lamp terminal 17 thereof to the battery, but block the flow of current to the low-beam filaments 2 of the head lamps 1 when the main switch 18 is moved to its first operating position A to connect the parking lamp terminal 20 thereof to the battery. The junction diode 27 thus operates to effect the continued operation of the parking lamps 27, despite the failure of either one, or both, of the head lamp low beam filaments 2, when the main switch 18 is in its second or head lamp operating position B and the dimmer switch 14 is set in position to operate the low-beam filaments 2 of the head lamps 1. The continued operation of the parking lamps 4, in case of the failure of either one or both of the low-beam filaments 2 of the head lamps 1, thus serves to clearly demarcate to an oncoming driver the lateral extremities of the approaching vehicle, thereby prevent any confusion or mistake on his part as to the location thereof and thereby promoting greater roadway safety. On the other hand, when the main switch 18 is set to its first operating position A to operate the parking lamps 4, the junction diode 27, because of its current-blocking characteristic, will then operate to prevent the flow of current to the low-beam filaments 2 of the head lamps 1. Thus the head lamps 1 will not become energized and instead only the parking lamps 4 will be energized. From the above description, it will thus be apparent that the vehicle headlighting and parking lamp system according to the invention functions to effect exactly the same manner of operation of the head lamps 1 and parking lamps 4 as is provided by the modified vehicle headlighting and parking lamp system as described hereinbefore and with which motor vehicles are being equipped at present.

In order to function properly in the intended manner, the junction diode 27 should be one having appropriate current and voltage characteristics for the particular application involved. For the customary 12-volt vehicle headlighting and parking lamp systems in general use today, junction diodes 27 having a current rating in the range of approximately 1 to 3 amperes and a reverse voltage rating in the range of approximately 50 to 100 volts have proven entirely satisfactory for the intended purpose. In this connection, junction diodes such as those commercially designated as A14A and A14F, and preferably those designated as A15A and A15F, all of which are manufactured by applicant's assignee, have been found to be particularly suitable for use in the vehicle headlighting and parking lamp systems according to the invention.

By virtue of the simplicity of the change required, the previous conventional-type vehicle headlighting and parking lamp systems can be easily and quickly converted, at relatively low expense, to one embodying the invention simply by connecting a junction diode 27 across the conductors 10 and 19 connected to the head lamp filaments 2 and parking lamp filaments 5 of such previous type headlighting and parking lamp systems. Junction diodes such as are suitable for use in the circuit according to the invention cost only a few cents at most, and they may be supplied with wires attached, in a so-called conversion kit, for easy attachment to the conductors 10 and 19 of existing vehicle headlighting and parking lamp systems to convert the latter to one according to the invention.

What I claim as new and desire to secure by Letters Patent of the United Stated is:

1. A vehicle headlighting system comprising, in combination, a head lamp and a parking lamp each containing a filament, a main switch having a head lamp terminal and a parking lamp terminal selectively connectable by said switch to a source of electric current, conductor means directly connecting said head lamp terminal to one end of said head lamp filament, said parking lamp terminal being connected directly to one end of said parking lamp filament, and a function diode connected directly across the said ends of the head lamp and parking lamp filaments and poled to block the of electric current to said head lamp filament, when the said parking lamp terminal is connected by said switch to said electric current source, but pass electric current from said source to said parking lamp filament so as to energize it simultaneously and continuously along with the energized head lamp filament and maintain the parking lamp filament continuously energized even though said head lamp filament be ruptured.

2. A vehicle headlighting system as specified in claim 1 and comprising a pair of said head lamps having their filaments connected in parallel and a pair of said parking lamps having their filaments connected in parallel.

3. A vehicle headlighting system as specified in claim 1 and comprising, in addition, a dimmer switch, said head lamp being provided with a low-beam filament and a high-beam filament selectively connectable each at one of their ends by said dimmer switch to said head lamp terminal, and said junction diode being connected across the said one end of the parking lamp filament and the low-beam filament.

4. A vehicle headlighting system as specified in claim 3 and comprising a pair of said head lamps having their respective low-beam and high-beam filaments connected in parallel and a pair of said parking lamps having their filaments connected in parallel.

5. A vehicle headlighting system as specified in claim 1 wherein the said junction diode has an average forward current rating in the range of approximately 1 to 3 amperes and a reverse voltage rating in the range of approximately 50 to 100 volts.